United States Patent
Gerard et al.

(10) Patent No.: US 6,209,128 B1
(45) Date of Patent: *Mar. 27, 2001

(54) APPARATUS AND METHOD FOR PROVIDING ACCESS TO MULTIPLE OBJECT VERSIONS

(75) Inventors: Scott Neal Gerard; Steven Lester Halter; Steven J. Munroe; Erik E. Voldal, all of Rochester, MN (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,597

(22) Filed: Jun. 5, 1998

(51) Int. Cl.$^7$ .................................................... G06F 9/45
(52) U.S. Cl. ............................................. 717/11; 707/203
(58) Field of Search ........................... 395/712; 717/11, 717/1; 707/8, 203, 511

(56) References Cited

U.S. PATENT DOCUMENTS

| | | | |
|---|---|---|---|
| 4,558,413 | * 12/1985 | Schmidt et al. | 364/300 |
| 5,499,365 | * 3/1996 | Anderson et al. | 707/203 |
| 5,535,389 | * 7/1996 | Elder et al. | 395/712 |
| 5,764,992 | * 6/1998 | Kullick et al. | 395/712 |
| 5,872,915 | * 2/1999 | Dykes et al. | 395/188.01 |
| 5,878,432 | * 3/1999 | Misheski et al. | 707/103 |
| 5,884,325 | * 3/1999 | Bauer et al. | 707/201 |

OTHER PUBLICATIONS

Feller. Software Process Support Through Software Configuration Management. IEEE. pp. 58–60, 1990.*

Ochuodho et al. A Process–Oriented Version and Configuration Management Model for Communications Software. ACM. pp. 109–120, 1991.*

Hicks et al. A Hypermedia Version Control Framework. ACM Transactions on Information Systems. vol. 16, No. 2, pp. 127–160, Apr. 1998.*

* cited by examiner

Primary Examiner—Mark R. Powell
Assistant Examiner—Wei Zhen
(74) Attorney, Agent, or Firm—Schmeiser, Olsen & Watts; Roy W. Truelson (57) ABSTRACT

According to the present invention, an apparatus and method for providing access to multiple object versions allows the system administrators to control which version of a given object is referenced by existing related objects. By providing an option for the system user to select and access different object versions, object upgrade policies can be flexible and accommodate the various needs of different object-oriented systems. The object versioning mechanism of the present invention provides several different options when modifying an existing object to create a new version. The various embodiments of the present invention provide a versioning mechanism to manage version updates for objects in an object-oriented system. The versioning mechanism disclosed herein implements the methods of the present invention by making a copy of an existing object whenever a new version of the existing object is to be introduced into an object-oriented system. After the copy of the existing object has been made, the existing object or the copy of the existing object can be modified to reflect the desired changes and to provide an updated version of the object. Whether the existing object or the copy of the existing object is modified depends on the specific system policy or objectives to be achieved. In addition, according to the desired system policy, the unmodified version of the object can be removed from the system, if desired. Alternatively, if both objects remain in the system, access to one or both of the objects may be further restricted by disabling all or at least some of the methods on the objects.

19 Claims, 8 Drawing Sheets

APPARATUS AND METHOD FOR PROVIDING ACCESS TO MULTIPLE OBJECT VERSIONS

RELATED APPLICATIONS

This application is related to the following U.S. patent applications: "Apparatus and Method for Disabling Methods Called on an Object," Ser. No. 09/096,880, filed on Jun. 12, 1998; and "Apparatus and Method for Versioning Persistent Objects," Ser. No. 09/096,132, filed on Jun. 11, 1998.

BACKGROUND OF THE INVENTION

1. Technical Field

This invention generally relates to object-oriented computer systems and more specifically relates to versioning for object-oriented systems.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system and, under the control of the OS/2 operating system, a user may execute an application program, such as a word processor. As the capabilities of computer systems have increased, the software programs designed for high performance computer systems have become extremely powerful. Additionally, software development costs continue to rise because more powerful and complex programs take more time, and hence more money, to produce.

One way in which the performance of application software programs has been improved while reducing the associated development costs is by the use of object-oriented programming concepts. The goal of using object-oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved. Closely connected with objects is the concept of "classes" of objects. A class is a formalized definition of a set of like objects. As such, a class can be thought of as an abstraction of the objects or as a definition of a type of object. Each object that is created in an object-oriented system is an instance of a particular class.

Computer programs naturally evolve over time. The evolution of object-oriented computer programs entails defining new objects that have implementations different than previous versions. As time passes, the type and quantity of information stored by these objects may need to be changed or enhanced to accommodate additional or different data types. In this case, the definition of the object will, of necessity, be changed to support the new object data storage requirements. This scenario typically occurs when a program is upgraded from a first software version to a newer, more powerful version of the program. A new release of an existing program may use a combination of new objects and previously implemented objects that were defined in an earlier version. The processes and activities associated with modifying, updating, and tracking changes in a class over a period of time are known as "versioning."

When the current version of an object is going to be updated, a copy of the original object may be made. This copy is made in order to preserve the state data of the original object. The state data of this copy is created based on the state data of the original object. The copy of the original object is a new object with a new object identity. It can be understood that once a version update is performed on an object, two versions of the object exist. The original object still exists with its original state data and object identity, and the new object exists with its new object identity and new version of state data.

Existing related objects reference one another to call methods and share data. In order to access a particular object, each existing related object has a pointer which references the object identity associated with the particular object. Typically, each existing related object has only one pointer that can be used to reference an object and, accordingly, each existing related object typically references only one particular version of that object. An existing related object references the version of the object whose object identity has been assigned to the pointer.

As mentioned, existing object-oriented systems allow only one version of a particular object. However, it is frequently necessary for an object-oriented system to maintain multiple versions of an object. Existing object-oriented systems are generally unable to maintain multiple versions of a given object.

For example, in order to track annual sales figures for their products, a sales corporation may create an object in an object oriented system called "Yearly Sales." All of the objects that need to reference the Yearly Sales object will contain a pointer to the Yearly Sales object. At the end of each month, the sales data for the proceeding month is entered into the Yearly Sales object, providing a cumulative figure for the company's year-to-date sales. However, before the data for the preceeding month is entered, the system makes a copy of the object before the update. For example, before adding the sales data for the month of May to the Yearly Sales object, a copy of the Yearly Sales object will be made which will include data for the months of January through April, assuming the corporation's sales year begins in January. After adding data for the month of May, five versions of the Yearly Sales object exist: one object containing January sales data, one object containing January–February sales data, one object containing January–March sales data, one object containing January–April sales data and one object containing January–May sales data. However, since related objects in the object-oriented system have only a single reference pointer, the only object that can be accessed is the version of the Yearly Sales object that contains the year-to-date sales data.

The sales corporation may have an Accounting Department and a Purchasing Department. The Accounting Department needs to spend part of the month of May analyzing the cumulative sales data contained in the Yearly Sales object through the month of April. No data for the month of May should be included in their analysis. Only the information contained in the January through April version of the Yearly Sales object is relevant for the calculations used in the Accounting Department's analysis. However, the Purchasing Department needs the most current sales data available so that product inventory can be adjusted to reflect developing market trends. Therefore, the Purchasing Department needs the version of the Yearly Sales object with contains the information on sales to date, including January through May.

As previously mentioned, the objects in the object-oriented system can only reference one version of the Yearly Sales object. Using current object-oriented technology, it is impossible for both the Accounting Department and the Purchasing Department to reference the respective desired version of the Yearly Sales object because the system recognizes only a single Yearly Sales object. This significant limitation will prevent object-oriented solutions from being developed for many environments that otherwise might benefit from the adoption of an object-oriented systems approach.

Without a mechanism for allowing multiple different versions of an object, the undesirable limitations of present systems will continue to restrict the development and adoption of object-oriented solutions. In turn, many businesses will not fully realize the potential benefits of object-oriented systems.

DISCLOSURE OF THE INVENTION

According to the present invention, an apparatus and method for providing access to multiple object versions allows the system administrators to control which version of a given object is referenced by existing related objects. By providing an option for the system user to select and access different object versions, object upgrade policies can be flexible and accommodate the various needs of different object-oriented systems. The object versioning mechanism of the present invention provides several different options when modifying an existing object to create a new version of the existing object.

The various embodiments of the present invention provide a versioning mechanism to manage version updates for objects in an object-oriented system. The versioning mechanism disclosed herein implements the methods of the present invention by making a copy of an existing object whenever a new version of the existing object is to be introduced into an object-oriented system. After the copy of the existing object has been made, the existing object or the copy of the existing object can be modified to reflect the desired changes and to provide an updated version of the object. Whether the existing object or the copy of the existing object is modified depends on the specific system policy or objectives to be achieved. In addition, according to the desired system policy, the unmodified version of the object can be removed from the system, if desired. Alternatively, if both objects remain in the system, access to one or both of the objects may be further restricted by disabling methods on the objects.

The foregoing and other features and advantages of the present invention will be apparent from the following more particular description of the preferred embodiment of the invention, as illustrated in the accompanying drawings.

BRIEF DESCRIPTION OF THE DRAWINGS

The preferred embodiments of the present invention will hereinafter be described in conjunction with the appended drawings, where like designations denote like elements, and.

BEST MODE FOR CARRYING OUT THE INVENTION

The present invention relates to object-oriented programming techniques. For those individuals who are not generally familiar with object-oriented programming, the Overview section below presents many of the basic concepts and terminology that will help to understand the invention. Individuals skilled in the art of object-oriented programming may wish to skip this section and proceed directly to the Detailed Description section of this specification.

1. Overview

Object-Oriented Technology v. Procedural Technology

Object-oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process used to solve the problem; whereas the focus of object-oriented design is on casting the problem as a set of autonomous entities that can work together to provide a solution. The autonomous entities of object-oriented technology are, of course, objects. Object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requester of services (client objects) from the providers of services (server objects) by a well defined encapsulating interface. In the classic object model, a client object sends request messages to server objects to perform any necessary or desired function. The message identifies a specific method to be performed by the server object and also supplies any required parameters. The server object receives and interprets the message, and can then decide what service to perform.

An object in an object-oriented computer program typically has attributes defined by state data that determine how the object will behave. If an object is transient, it is created within a process, and terminates when the process ends. If an object is persistent, however, mechanisms are put in place to allow the object to survive the process that creates it so it can be accessed by other processes. Whenever a new object is created, the object has a unique object identity associated with the object at the time of creation. As long as the object remains available to the system, the object can be accessed by using the object identity associated with the object.

In an object-oriented system, related objects reference one another to call methods on other objects and to share data with other objects, thereby accomplishing the purposes of the object-oriented system. In order for a first object to reference a second object and exchange data with or execute method calls on the second object, the first object will reference the object identity associated with the second object. Typically, each existing related object has only one pointer to reference an object and each existing related object typically references only one particular version of that object. In order to allow existing related objects to reference the correct version of an object, a data pointer in a header section of the referenced object must point to the correct version of object state data. The present invention allows the system to access different versions of an object by using the data pointers in the object header section.

There are many computer languages available today that support object-oriented programming. For example, Smalltalk, Object Pascal, C++ and JAVA are all examples of languages that support object-oriented programming to one degree or another.

2. Detailed Description

According to the present invention, an apparatus and method for providing access to multiple object versions allows the user to designate which version of a given object is referenced by existing related objects. The versioning mechanism disclosed herein implements the methods of the present invention by making a copy of an existing object whenever a new version of the existing object is to be introduced into an object-oriented system. After the copy of the existing object has been made, the existing object or the copy of the existing object can be modified to reflect the desired changes and to provide an updated version of the object. Whether the existing object or the copy of the existing object is modified depends on the specific system policy or objectives to be achieved. In addition, according to the desired system policy, the unmodified version of the object can be removed from the system, if desired. If both objects remain in the system, access to one of the objects may be further restricted.

Figure 1:
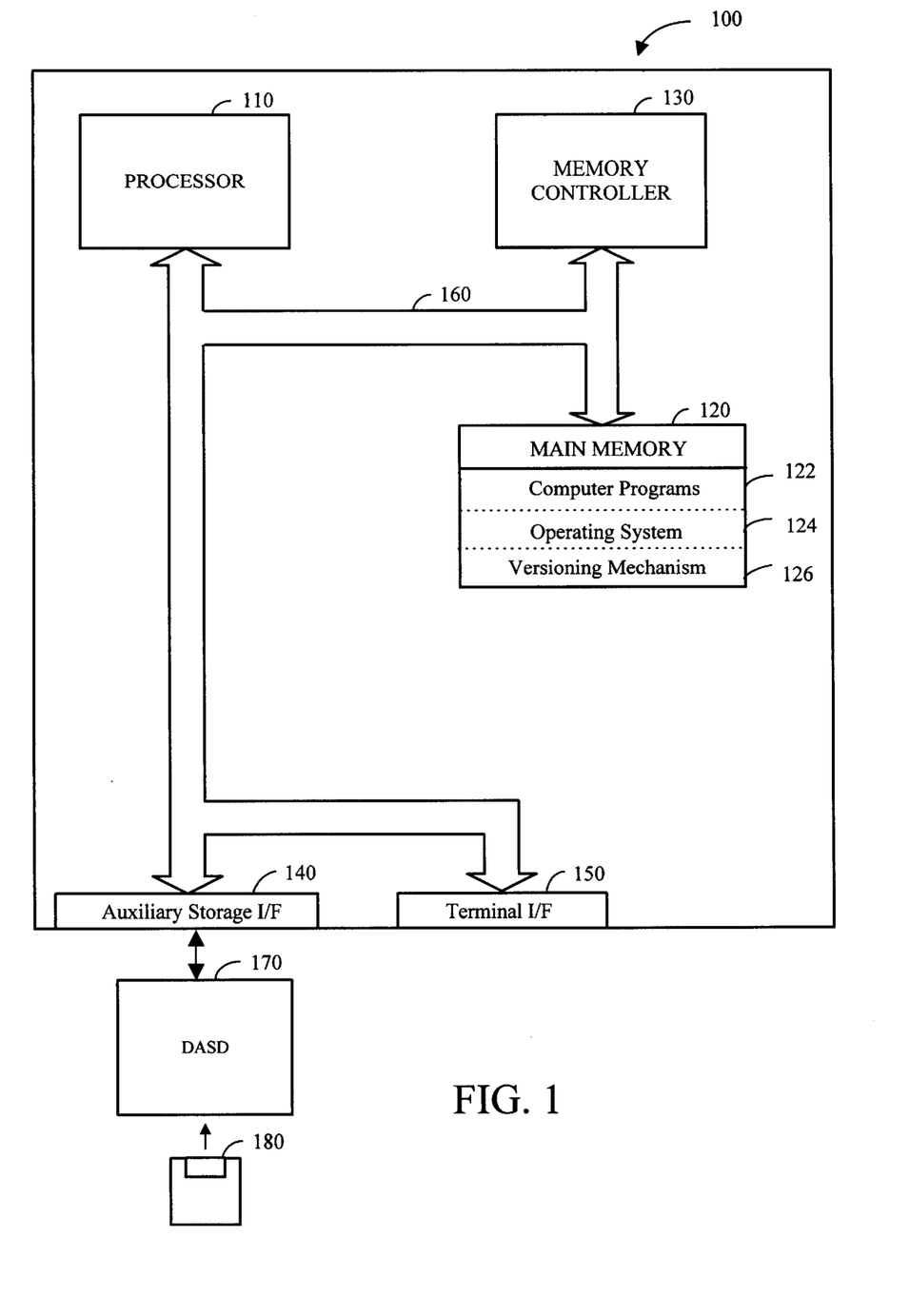
FIG. 1 is a block diagram of an apparatus according to a preferred embodiment of the present invention.

Referring now to FIG. 1, a computer system 100 in accordance with a preferred embodiment of the present invention is an enhanced IBM AS/400 mid-range computer system. However, those skilled in the art will appreciate that the method and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes an object-oriented computer program 122 within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor (not shown) separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supportsdirectional communication in a computer-related environment could be used.

Main memory 120 suitably contains one or more computer programs 122, an operating system 124, and a versioning mechanism 126. Computer program 122 in memory 120 is used in its broadest sense, and includes any and all forms of computer programs, including source code, intermediate code, machine code, and any other representation of a computer program.

It should be understood that main memory 120 will not necessarily contain all parts of all mechanisms shown. For example, portions of computer program 122 and operating system 124 may be loaded into an instruction cache (not shown) for processor 110 to execute, while other files may well be stored on magnetic or optical disk storage devices (not shown). In addition, although computer program 122 is shown to reside in the same memory location as operating system 124 and versioning mechanism 126, it is to be understood that main memory 120 may consist of multiple disparate memory locations.

Figure 2:
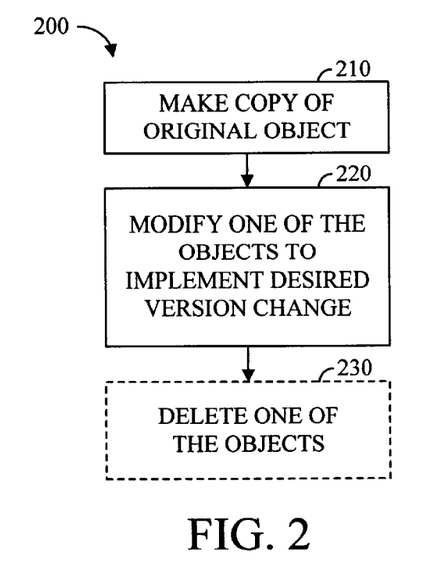
FIG. 2 is a flow chart depicting a method for versioning objects according to a preferred embodiment of the present invention.

Referring now to FIG. 2, a method 200 for versioning persistent objects is illustrated. As shown in FIG. 2, the first step is to make a copy of the original object which will be used as the basis for a new version (step (210). This step may be accomplished by any object-copying methods known to those skilled in the art. For example, a copy constructor object may be utilized. In this case, the copy constructor object typically creates a new object of the same class as the object to be updated and copies the state data from the original object into the new object, effectively creating a copy of the original object. Those skilled in the art will recognize that the class of the new object may be different than the class of the original object. Next, either the original object or the copy of the original object may be modified as necessary to implement the desired version change (step 220). The various possibilities for actually changing the original object and/or the copy of the original object are explained in greater detail below. Finally, after the versioning changes have been made to the objects, either the original object or the copy of the original object may optionally be deleted (step 230) or "frozen." Freezing an object means to disable write methods for the object or otherwise protect the object and keep it from being modified. Various methods for freezing an object are disclosed in "Apparatus and Method for Disabling Methods Called on an Object," Ser. No. 09/096,880, filed on Jun. 12, 1998. In addition, in some circumstances, it may be desirable to keep the unmodified version of the original object available as an archival object for future reference, recovery, or other purposes. In other situations, it may be system policy to delete any unused object from the system.

Figure 3:
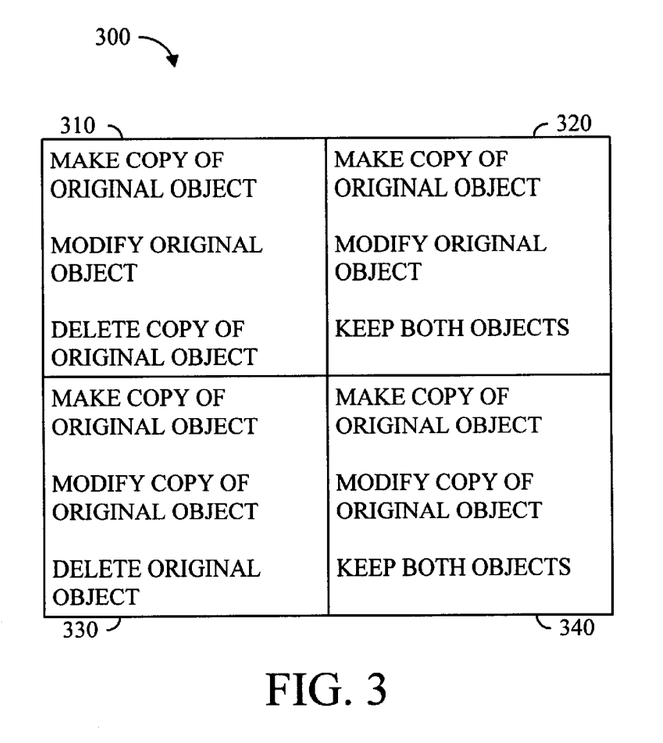
FIG. 3 is a table showing the versioning options for the preferred embodiments of the present invention.

Referring now to FIG. 3, a table 300 illustrates the various options that exist when using the preferred embodiments of the versioning methods of the present invention. As shown in FIG. 3, there are four basic options that can be implemented. In option 310, after the copy of the original object has been made, the original object is modified to provide the new version of the original object and the copy of the original object is deleted. While not the most preferred method, this option is included for the sake of completeness and to illustrate each of the possibilities. This option can be optimized and used to simply modify the original object. In option 320, after the copy of the original object has been made, the original object is modified to provide the new version of the original object and both the original object and the copy of the original object are kept. In this case, existing related objects reference the latest or most recent version of the object state, and the copy of the original object may be considered an archival copy. Access to the copy of the original object may be provided by the system, if desired. In option 330, after the copy of the original object has been made, the copy of the original object is modified to provide the new version of the original object and the original object is deleted. Existing related objects no longer refer to any valid object. If an existing related object attempts to use the previously established reference to the deleted object, the system will provide an error condition. The copy of the original object is the most recent version of the object. In option 340, after the copy of the original object has been made, the copy of the original object is modified to provide the new version of the original object and both the original object and the copy of the original object are kept. Existing related objects continue to reference the original version of the object state. The existing related objects are not aware of any changes to the object state which are present in the newly-created copy of the original object.

For purposes of demonstrating the methods of the present invention in greater detail, several examples will be presented to explain the options shown in table 300. For the purposes of the following examples, it should be assumed that several existing related objects have established pointers which reference an object with an object identity "ID1." In order to provide clarity it should be understood that the object whose identity is ID1 shall be called the original object. The existing object reference pointers allow existing related objects to share data with, and call methods on the object whose object identity is ID1.

In the following examples, a version update will be performed on the original version of the object and a new object, with object identity "ID2" will be created as explained above. In order to provide clarity, it should be understood that the object with object identity ID2 shall be called the copy or new version of the original object which has an object identify of ID1. Since no changes are being made to any other objects, all existing related objects will continue to access the original object with object identity of ID1. If the original object is deleted, existing related objects have an invalid pointer. Any attempt by an existing related object to use the invalid pointer will result in an error condition. However, the generation of an error condition is preferable to allowing an existing related object method to be completed using invalid data. By changing the state of the original object or the state of the copy of the original object, existing related objects can access either the original state data or the new, modified state data in a way that is transparent to the existing related objects.

Figure 4:
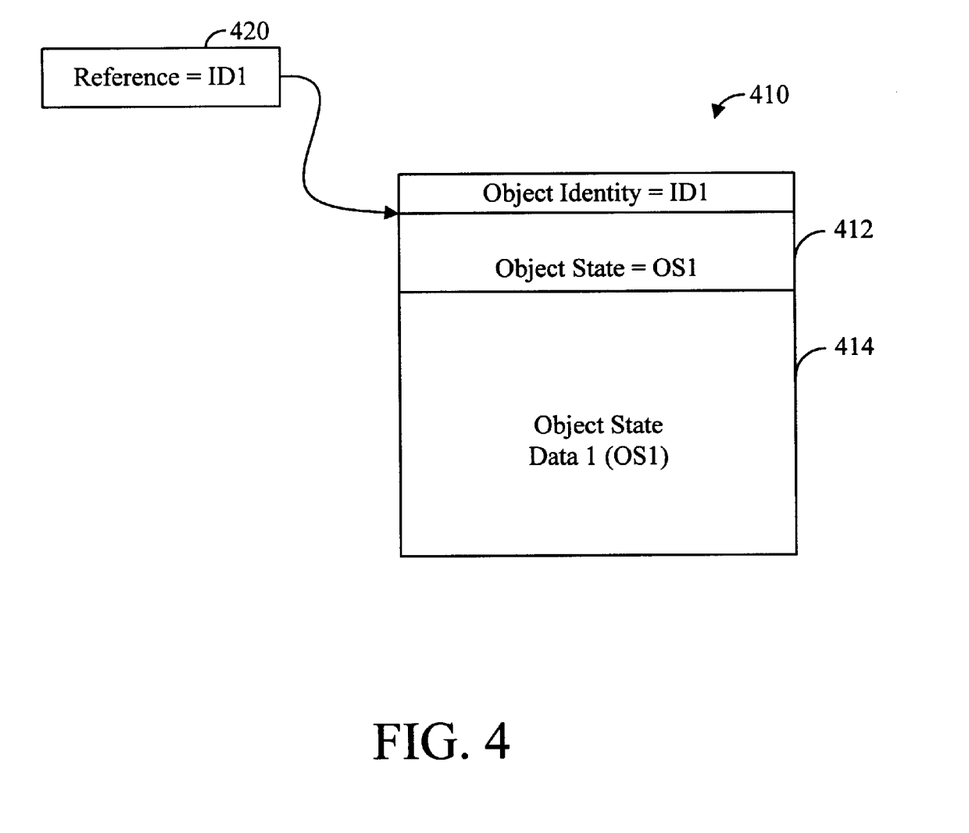
FIG. 4 is a generalized object diagram for an object suitable for use with the preferred embodiments of the present invention.

Referring now to FIG. 4, an object 410 includes a header section 412 and a data section 414. It should be assumed for purposes of demonstrating a preferred embodiment of the present invention that object 410 has an object identity ID1 and that data section 414 of object 410 is called OS1.

Existing related objects use pointers to reference object 410. For example, object reference 420 represents a pointer to object 410 from an existing related object which uses object reference 420 to reference object 410. Although not shown in FIG. 4, other objects may also have similar object references to object 410.

Figure 5:
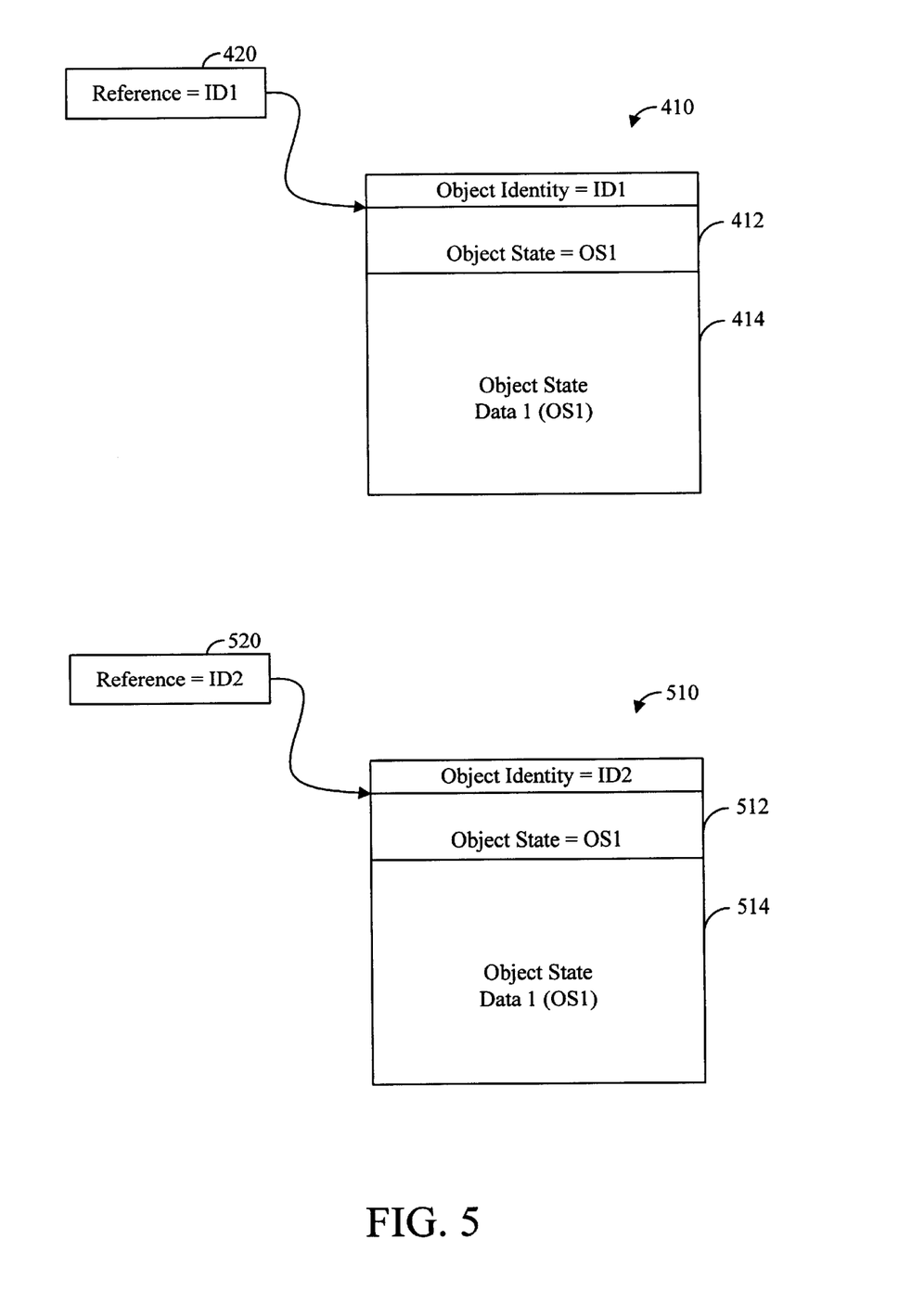
FIG. 5 is a block diagram showing a copy of the object of FIG. 4 constructed in accordance with a preferred embodiment of the present invention.

Referring now to FIG. 5, the first step of method 200 of FIG. 2 is illustrated. In FIG. 2, object 510, which is a copy of object 410, has been created. Object 510 has a unique object identity, ID2, but is otherwise the same as object 410. Object 410 is again shown along with a new object 510. Similar to object 410, object 510 contains a header section 512 and a data section 514. For purposes of this example, it should be assumed that object 410 is being updated by versioning mechanism 126 and that new object 510 has been created as part of this process Data section 514 belonging to new object 510 may be called OS2. In addition, an object reference 520 has been established by creating a pointer which points to object 510. Object reference 520 may be stored using any method known to those skilled in the art so that its value may be explicitly referenced by any object that needs to access object 510. For example, object reference 520 may be stored using a directory or other naming service provided by the system. As shown in FIG. 5, object 410 may be referenced by any object which has an object reference 420 which points to object 410. Similarly, object 510 may be referenced by any object which has or can find an object reference 520 which points to object 510.

Figure 6:
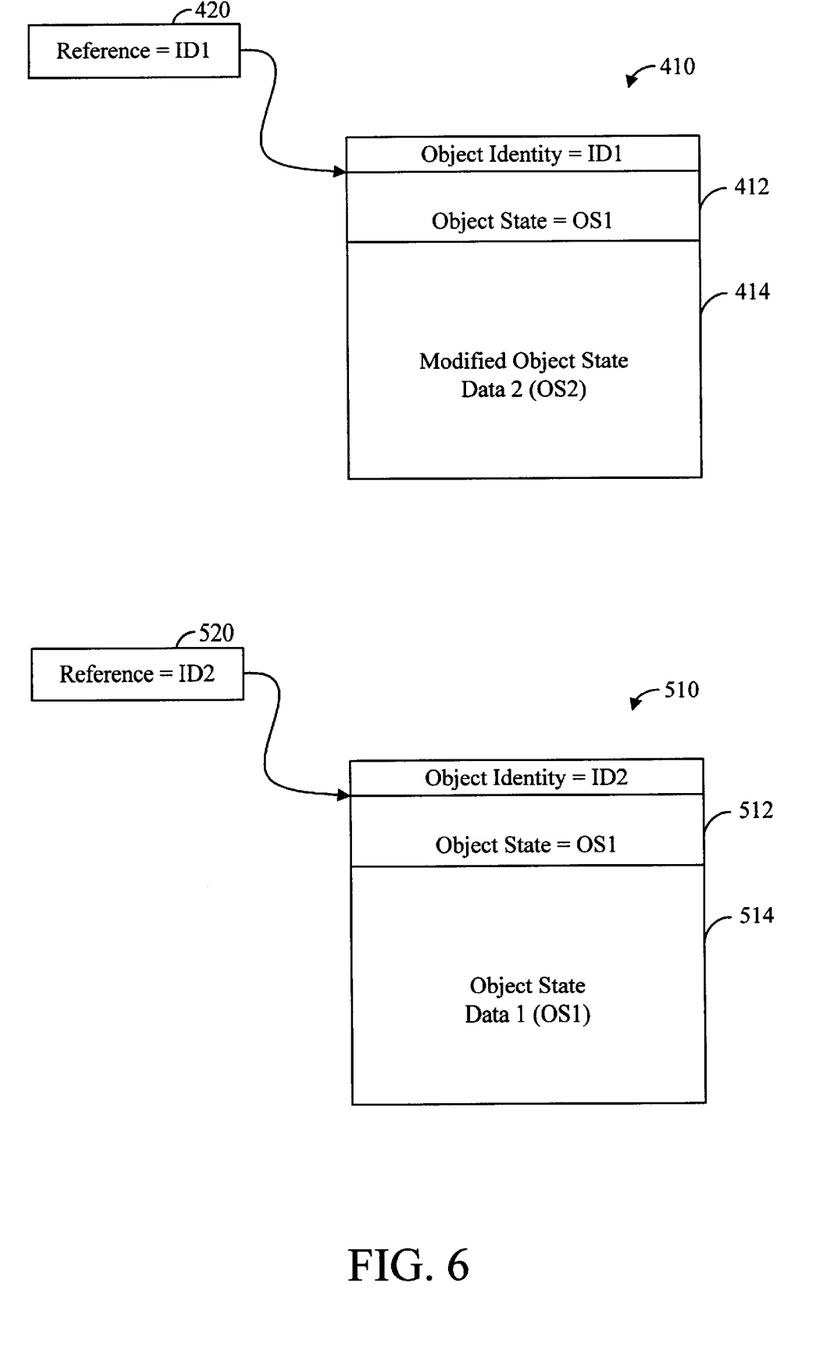
FIG. 6 is a block diagram showing the objects of FIG. 5 modified to create a new version in accordance with a preferred embodiment of the present invention.

Referring now to FIG. 6, object 410 of FIG. 5 has been modified to create a new version. As shown in FIG. 6, data section 414 has been modified to reflect the version-related changes that have been implemented in the system. Since all existing related objects have maintained their previously established object references, the existing related objects can reference object 410 using object reference 420. However, since data section 414 has been modified, the existing related objects will now reference the new version of object 410. If any existing related object needs to reference the old version of object 410, this can be accomplished by an explicit reference to object 510 using object reference 520. The situation shown in FIG. 6 is an illustration of option 320 in table 300 of FIG. 3.

Figure 7:
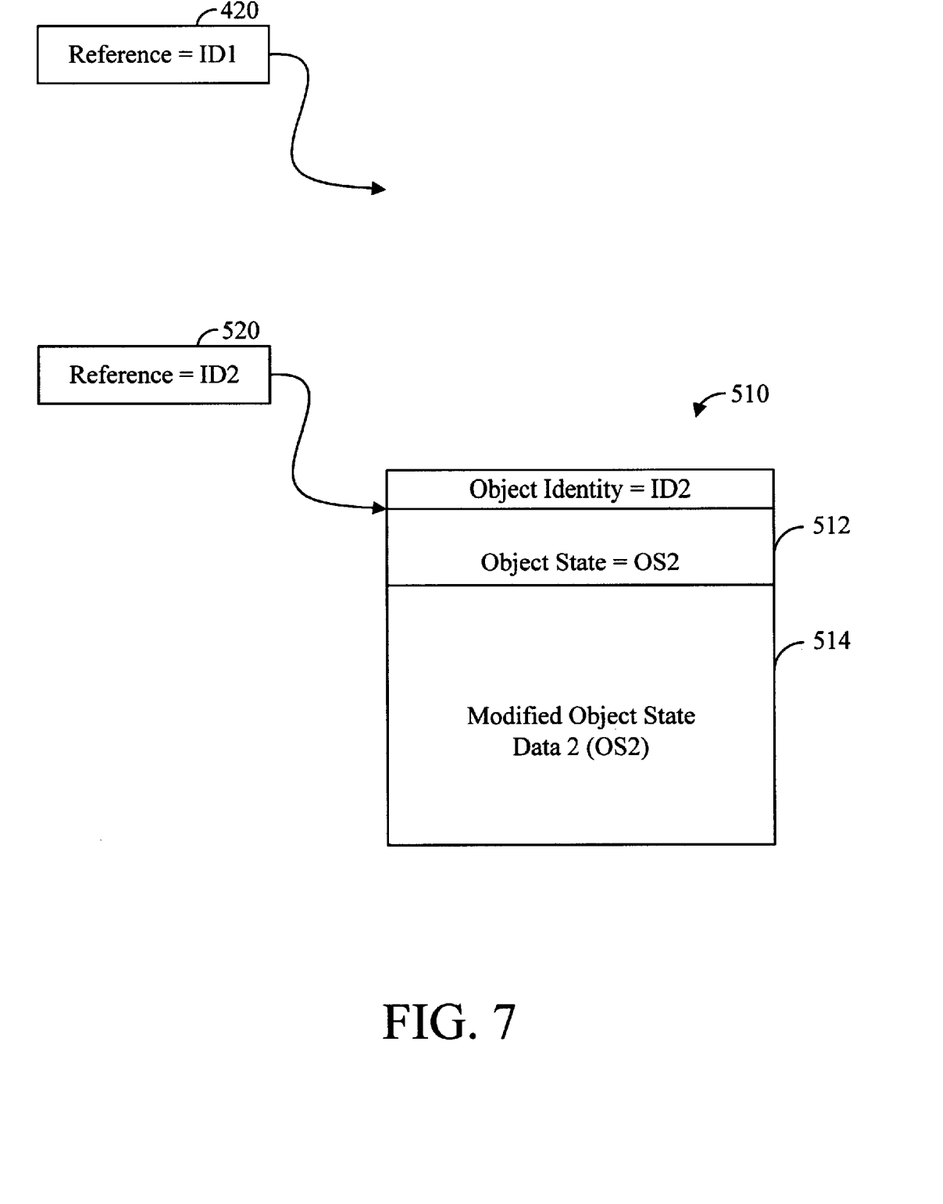
FIG. 7 is a block diagram showing the objects of FIG. 5 modified to create a new version in accordance with an alternative preferred embodiment of the present invention.

Referring now to FIG. 7, object 510 of FIG. 5 has been modified to create a new version of object 410. However, in this case, object 410 has been deleted and can no longer be accessed by any existing related objects. This means that any existing related object which attempt to access object 410 using the previously established object reference 420 will get an error condition. Objects which wish to access the new version of the object, object 510, must do so using object reference 520. The situation shown in FIG. 7 is an illustration of option 330 in table 300 of FIG. 3.

Figure 8:
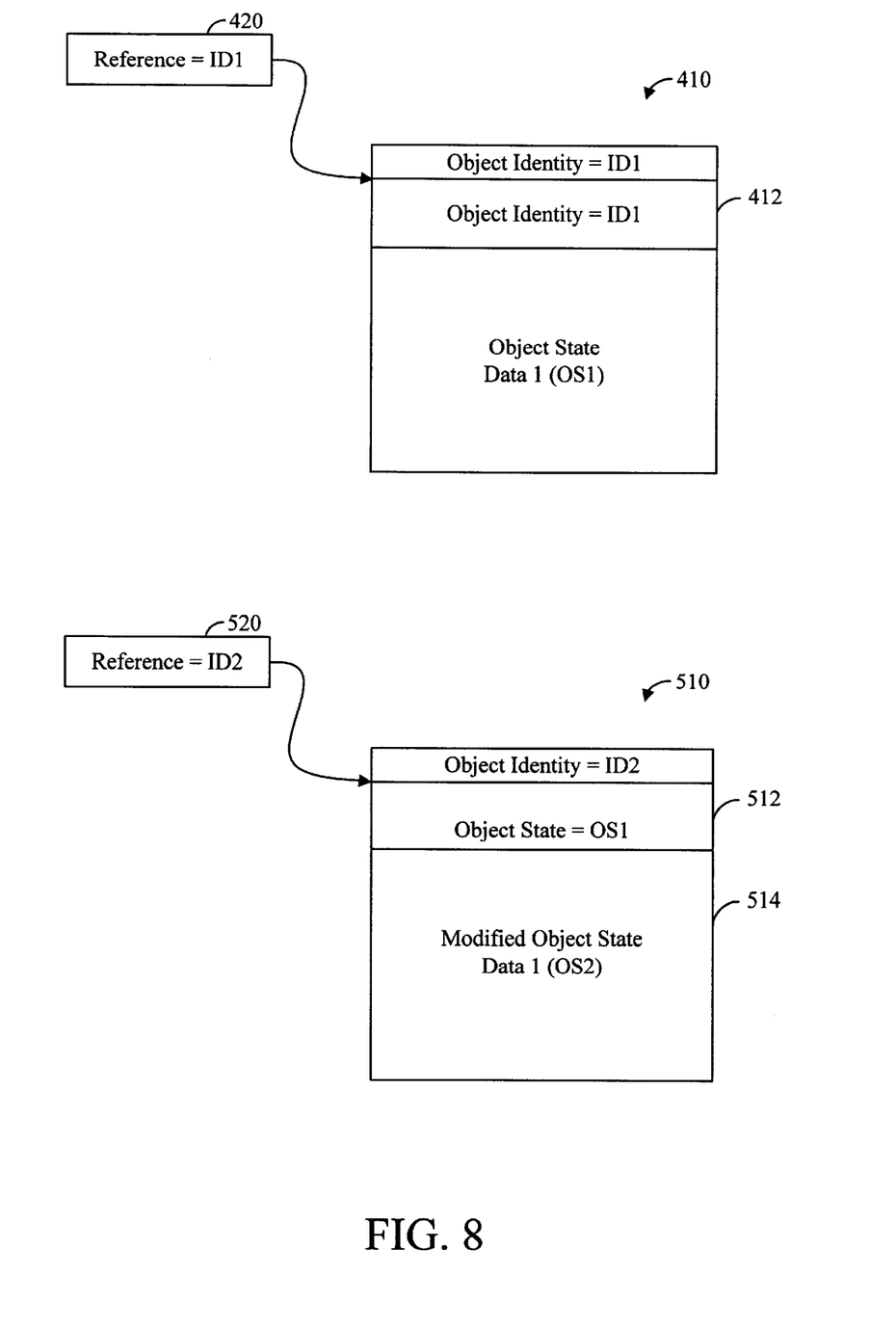
FIG. 8 is a block diagram showing the objects of FIG. 5 modified to create a new version in accordance with an alternative preferred embodiment of the present invention.

Referring now to FIG. 8, object 510 of FIG. 5 has been modified to create a new version of object 410. This means that any existing related object which resolves a reference to an object using the previously established object reference 420 will access the new version of the state data contained in object 410. Objects which wish to access the new version of the object, object 510, must do so using object reference 520. The situation shown in FIG. 8 is an illustration of option 340 in table 300 of FIG. 3.

Figure 9:
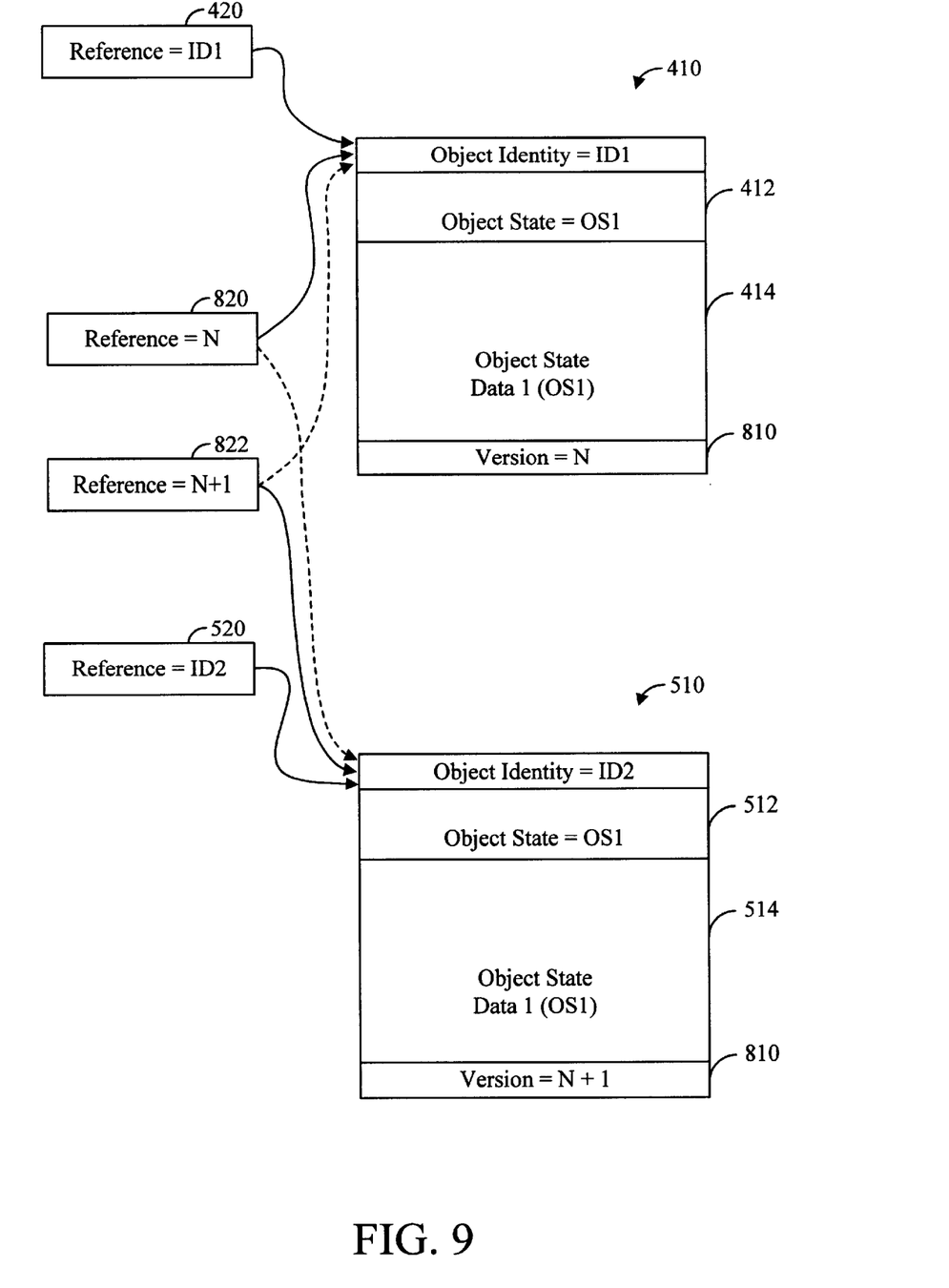
FIG. 9 is a block diagram showing the objects of FIG. 5 modified to create and access multiple versions of an object in accordance with an alternative preferred embodiment of the present invention.

Referring now to FIG. 9, an alternative preferred embodiment for accessing new versions of objects is illustrated. In FIG. 9, objects 410 and 510 have a version identifier field 810. This new field may be added to all objects of a given class so that different versions of an object can be tracked and maintained by using the version number of the object.

For example, as shown in FIG. 9, object 410 has a value of "N" stored in version identifier field 810. When object 410 is updated to a new version, object 510 is created and the version identifier field in object 510 will be updated to "N+1." Object references 820 and 822 may be created and saved using a lookup table or any other method known to those skilled in the art. The object corresponding to version N and the object corresponding to version N+1 can easily be found by using their respective version numbers. Note that for option 320 of table 300 in FIG. 3, reference 820 refers to object 510 and reference 822 refers to object 410. For option 340 of table 300 in FIG. 3, reference 820 refers to object 410 and reference 822 refers to object 420.

The embodiments an examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

What is claimed is:

1. An apparatus comprising:

a processor;

a memory coupled to the processor;

a plurality of encapsulated objects residing in said memory, each of said objects representing an instance of a respective class of a hierarchical set of classes;

an existing object of said plurality of encapsulated objects residing in the memory and referenced by an existing object reference; and a versioning mechanism residing in the memory, the versioning mechanism creating a new object which is a copy of the existing object and which is referenced by a new object reference, the versioning mechanism modifying either the existing object or the new object, thereby creating a modified version of the existing object and an unmodified version of the existing object and allowing other objects of said plurality of encapsulated objects to concurrently access both: (a) the modified version of the existing object through a first one of the set consisting of the existing object reference and the new object reference; and (b) the unmodified version of the existing object through a second one of the set consisting of the existing object reference and the new object reference, said second one of said set being different from said first one of said set.

2. The apparatus of claim 1 wherein the versioning mechanism deletes either the existing object or the new object.

3. The apparatus of claim 1 wherein the existing object and the copy of the existing object each further comprise a version identifier field and wherein each of the version identifier fields contains a version number.

4. The apparatus of claim 3 wherein the version number in the version identifier field of the existing object is different than the version number in the version identifier field of the copy of the existing object.

5. A method performed on a computer system, said computer system comprising a plurality of encapsulated objects residing in a memory, each of said objects representing an instance of a respective class of a hierarchical set of classes, including an existing object of said plurality of encapsulated objects that is referenced by an existing object reference, the method comprising the steps of:

using a versioning mechanism to create an new object which is a copy of the existing object and which is referenced by a new object reference; and modifying either the existing object or the new object, thereby creating a modified version of the existing object and an unmodified version of the existing object and allowing other objects of said plurality of encapsulated objects to concurrently access both: (a) the modified version of the existing object through a first one of the set consisting of the existing object reference and the new object reference; and (b) the unmodified version of the existing object through a second one of the set consisting of the existing object reference and the new object reference, said second one of said set being different from said first one of said set.

6. The method of claim 5 further comprising the step of deleting either of the existing object or the new object.

7. The method of claim 6 wherein the step of deleting either of the existing object or the new object comprises the step of deleting the existing object.

8. The method of claim 6 wherein the step of deleting either of the existing object or the new object comprises the step of deleting the new object.

9. The method of claim 5 wherein the step of creating a new object comprises the step of using a constructor object to make a copy of the existing object and copying the state data from the existing object into the new object.

10. A method for creating a modified version of an existing object on a computer system, said computer system comprising a plurality of encapsulated objects residing in a memory, each of said objects representing an instance of a respective class of a hierarchical set of classes, including the existing object of said plurality of encapsulated objects that is referenced by an existing object reference, the method comprising the steps of:

using a versioning mechanism to make a copy of the existing object, the copy being referenced by a new object reference, wherein both the existing object and the copy of the existing object each contain a version identifier field;

modifying one of the existing object or the copy of the existing object, thereby creating a modified version of the existing object and an unmodified version of the existing object and allowing other objects of said plurality of encapsulated objects to concurrently access both: (a) the modified version of the existing object through a first one of the set consisting of the new object reference and the existing object reference; and (b) the unmodified version of the existing object through a second one of the set consisting of the new object reference and the existing object reference, said second one of said set being different from said first one of said set; and updating the version field of the modified version of the existing object to reflect a new version number.

11. The method of claim 10 further comprising the step of accessing the modified version of the existing object by referencing the new version number contained in the version identifier field.

12. The method of claim 10 further comprising the step of disabling at least one method on either the existing object or the copy of the existing object.

13. A program product tangibly embodying a program of machine-readable instructions executable by a computer system, the program product comprising:

a versioning mechanism for a plurality of encapsulated objects residing in said computer system, each of said objects representing an instance of a respective class of a hierarchical set of classes, the versioning mechanism creating a new object of said plurality of encapsulated objects which is a copy of an existing object of said plurality of encapsulated objects and which is referenced by a new object reference, the existing object referenced by an existing object reference, the versioning mechanism modifying at least one of the existing object or the new object, thereby creating a modified version of the existing object and an unmodified version of the existing object and allowing other objects of said plurality of encapsulated objects to concurrently access both: (a) the modified version of the existing object through a first one of the set consisting of the existing object reference and the new object reference; and (b) the unmodified version of the existing object through a second one of the set consisting of the existing object reference and the new object reference, said second one of said set being different from said first one of said set; and signal bearing media bearing the version mechanism.

14. The program product of claim 13 wherein the signal bearing media comprises transmission media.

15. The program product of claim 13 wherein the signal bearing media comprises recordable media.

16. The program product of claim 13 wherein the versioning mechanism deletes the existing object after modifying at least one of the existing object or the new object.

17. The program product of claim 13 wherein the versioning mechanism deletes the unmodified object after modifying at least one of the existing object or the new object.

18. A method for versioning encapsulated objects on a computer system, said computer system comprising a plurality of said encapsulated objects residing in a memory, each of said objects representing an instance of a respective class of a hierarchical set of classes, including an existing object of said plurality of encapsulated objects that is referenced by an existing object reference, the method comprising the steps of:

using a versioning mechanism to make a copy of the existing object, the copy being referenced by a new object reference;

using a versioning mechanism to copy at least a portion of state data from the existing object into a new object; and modifying the existing object, thereby creating a modified version of the existing object and an unmodified version of the existing object and allowing other objects of said plurality of encapsulated objects to concurrently access both: (a) the modified version of the existing object through the existing object reference; and (b) the unmodified version of the existing object through the new object reference.

19. The method of claim 18 further comprising the step of disabling at least one method on the existing object.

* * * * *